Feb. 27, 1934.     J. HACKETHAL     1,948,709
VALVE
Filed Nov. 23, 1931     2 Sheets-Sheet 1

Inventor
Johannes Hackethal
by Knight Bros
attorneys

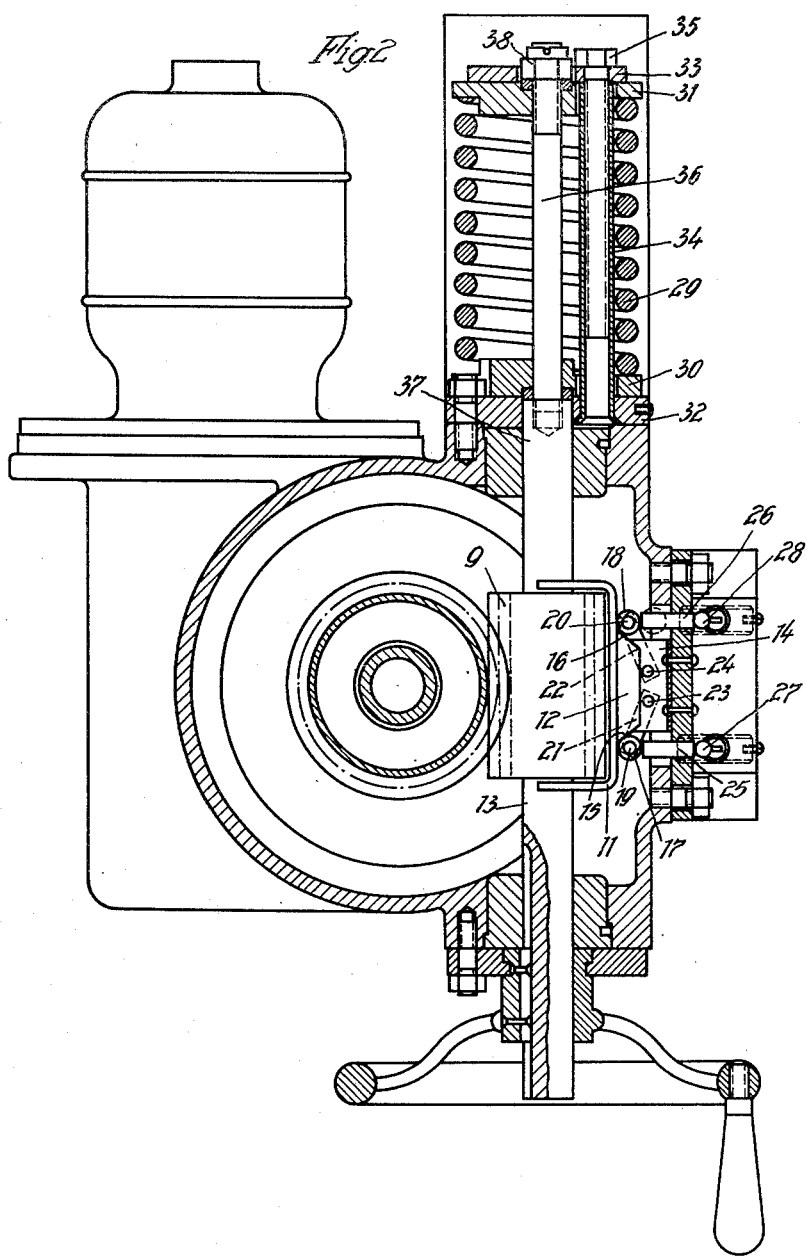

Patented Feb. 27, 1934

1,948,709

UNITED STATES PATENT OFFICE 1,948,709

VALVE

Johannes Hackethal, Nordhausen, Germany, assignor, by mesne assignments, to Westinghouse Electric & Manufacturing Company, a corporation of Pennsylvania Application November 23, 1931, Serial No. 576,821
In Germany November 20, 1930

3 Claims. (Cl. 137—139)

My invention relates to valves and more particularly to a valve provided with a planetary gear and a limit switch.

Electrically operated valves are known in which the motor drives the valve spindle by means of a worm through an interposed gearing. Other arrangements are also known in which the worm-wheel in engagement with the motor shaft acts as a nut for the axially displaceable worm as soon as the valve spindle offers a resistance to a further rotation, and in which the worm consequently shifted axially in the one or the other direction operates a switch which opens the motor circuit. In order to be able to control the valve in case of failure of the motor, the gearing has been provided with a second worm-wheel engaging with a worm which can be turned by means of a handwheel. As on the one hand the handwheel is not to take part in the movement when the motor drive is in action, and on the other hand, the motor is not to turn when the handwheel is being operated, both worms have been made self-locking, or irreversible, and the gearing to consist of a combination of two planetary gears. This gearing is so constructed that the planetary pinions of two internally toothed wheels are keyed to a common shaft journalled in the motor-driven worm-wheel located between the two toothed wheels. The internally toothed wheel, which also carries the worm-wheel for the hand drive, as well as the worm-wheel for the motor drive and the lower toothed wheel are mounted on the valve spindle.

The lower toothed wheel is placed on a square part of the spindle on which it is capable of being shifted, while the other parts are free to turn on the spindle. If with this arrangement the spindle is moved by means of the hand-driven worm, the self-locking motor-driven worm forms the necessary fixed point for the intermediate gearing, and contrariwise the handwheel worm forms the necessary fixed point as soon as the motor-driven worm turns the spindle. With this gearing the motor is cut out by a switch operated from the axially displaceable motor-driven worm. A spring at the same time compressed by the worm exerts the force for pressing the valve on its seat.

In practice, the above arrangement has, however, certain disadvantages. Owing to its moment of gyration, the motor still makes a greater or smaller number of revolutions after the limit switch has interrupted the current. This causes some difficulties. The axially displaceable worm travels further than would be necessary to lift the contact spring off the contact member to open the circuit. If the springs are not particularly long, they are consequently bent back too far, and break. Switches of standard types are under these circumstances not suitable at all for such purposes.

These drawbacks are according to my invention eliminated by causing the limit switch to be moved by the hand-driven worm instead of by the motor-driven worm.

The advantages just pointed out and others not hereinbefore specifically mentioned will become more apparent from a study of the following specification and the drawings accompanying this specification, wherein:

Fig. 2 is a plan view, with parts in section, of the showing in Fig. 1.

Figure 1:
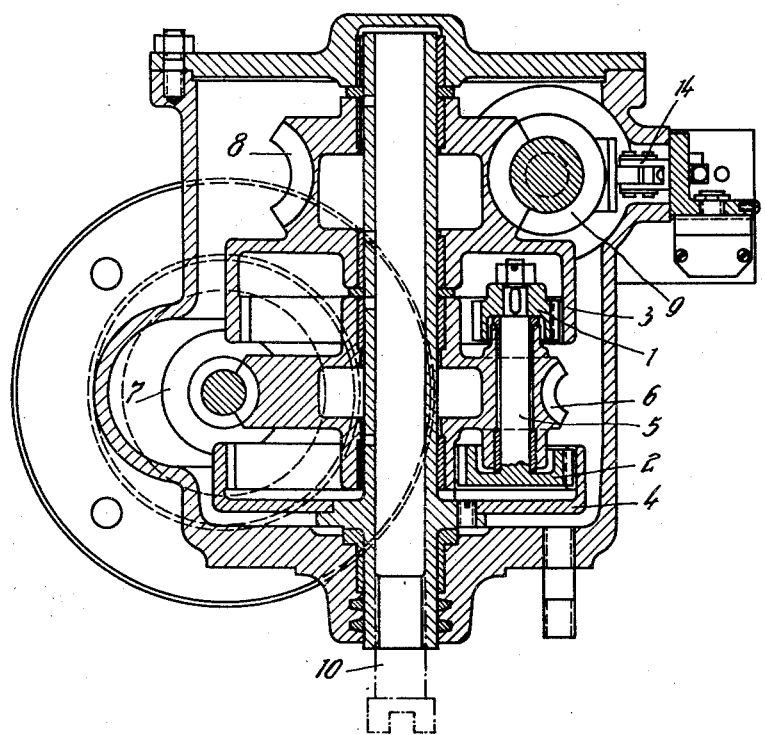
Figure 1 is a vertical sectional view of the valve actuating mechanisms.

The motor-driven worm is, as shown, supported in bearings in the normal manner and secured against lateral movements, while the handwheel-driven worm is so arranged as to be capable of being shifted in the axial direction contrary to the action of a spring. This arrangement has quite a number of advantages. The limit switch is now no longer moved directly by the motor but through an interposed gearing which reduces the speed imparted by the motor. The axial displacement of the worm is thereby greatly reduced. In addition to this, the moment of gyration of the motor is, owing to the friction of the interposed gearing, sooner expended, so that the motor itself requires less time to slow down.

Furthermore, according to my invention a fork grasps round the axially displaceable worm, and onto this fork is attached a member the outline of which forms a curved path consisting of two slanting surfaces ending in a straight part. On the path formed by these surfaces two rollers run and control the switch. Owing to the straight part of the path, the rollers can be lifted only to a certain maximum height which remains the same, independent of the further axial displacement of the worm. With this arrangement the construction of special switches becomes unnecessary and any of the types of switches available on the market can be used.

An example for carrying out my invention is shown more in detail in Figs. 1 and 2 of the drawings hereinbefore referred to. The planetary pinions 1 and 2 of the internally toothed wheels 3 and 4 are keyed to the common shaft 5. The shaft 5 is journalled in the worm-wheel 6 meshing with the motor-driven worm 7. The toothed wheel 3 and the worm wheel 8 meshing with the hand-driven worm 9 may be united so as to form a single body. The toothed wheel 3 with the worm-wheel 8, and also the worm-wheel 6 are mounted on the valve-spindle 10 and turn freely on same, while the toothed wheel 4 turns the spindle without hindering its axial displacement. The hand-driven worm 9 is embraced by a fork 11. Onto the latter is attached a curved member 12. While the fork 11 rests on the shaft 13, the curved member on the fork is guided at the same time in the U-shaped member 14. The curved member has two slanting surfaces 15 and 16 up which the one or the other of the rollers 17 or 18, runs according to the direction in which the hand-driven worm is displaced. The rollers 17 and 18 turn on axles 19 and 20 resting in fork-shaped levers 21 and 22. When the one or the other of the rollers 17 or 18 runs up the respective slanting plane, its lever turns on the pivot 23 or 24, as the case may be, the pressure bolt 25 or 26 travels outwardly and pushes the knobs 27 or 28 of the lever switches into the "off" position. As an axial displacement of the worm and the opening of the switch is only to take place when the back pressure on the worm exceeds a predetermined maximum, a spring 29 arranged between two spring washers 30 and 31 acts in opposition to the displacement of the worm. So long as the valve is not completely open or completely closed, the spring washer 30 rests against the flange 32, whilst the spring washer 31 presses against the plate 33. Into the tube 34, fastened in the flange 32, the bolt 35 is screwed, which holds the plate 33 in position. The spring washers 30 and 31 are provided with holes and pushed over the tube 34, so that they are prevented from rotating with the spindle 36. When the worm 9 is displaced in the one or the other direction, the shoulder 37 takes the spring washer 30, or the ring 38 takes the spring washer 31, along with it and compresses the spring 29.

The action of the gear and of the switch in connection with same is as follows: Let us assume that the valve spindle is at the moment in an intermediate position and that the motor is put into operation to open or close the valve completely. The revolving motor-driven worm 7 then causes the worm-wheel 6 with the shaft 5 to rotate. Owing to the self-locking worm 9, the worm-wheel 8 with the toothed wheel 3 is stationary, so that the planetary pinion 1 rolls round on the internal teeth of the toothed wheel. As the revolving planetary pinion 1 is keyed to the axle 5 which carries the planetary pinion 2, the two planetary pinions make the same number of revolutions. Now the planetary pinion 2 has a larger diameter than the planetary pinion 1. Consequently, the toothed wheel 4, with the internal teeth of which the wheel 2 meshes, must also turn. The wheel 4 is shiftably mounted on a square part of the spindle 10, so that the spindle is also caused to take part in the movement of the wheel 4, without being hindered in its movement up and down. When the valve spindle has reached its end positon the toothed wheel 4 comes to a standstill.

The planetary pinion 2 now rolls on the internal teeth of the toothed wheel 4 so that the wheel 1 forces the toothed wheel 3, which up to then stood still, to rotate. The worm wheel 8 presses the worm 9, in opposition to the action of the spring 29, out of its mid-position; the roller 17, or the roller 18, runs up the slanting plane of the curved member 12 on the respective side, and the switch opens the circuit. In the completely closed position of the valve, the spring 29 supplies the force for pressing the valve on its seat.

I claim as my invention:

1. A valve, the spindle of which is displaceable through a differential gear simultaneously by a motor and by hand independently of one another, in combination with a limit switch in connection with said differential gear, said differential gear being at least partly interposed between the motor and the limit switch, a self-locking worm capable of being shifted axially in both directions in opposition to the action of a spring being used for the hand drive, and means being provided for operating said limit switches from said worm.

2. A valve, the spindle of which is displaceable through a differential gear simultanously by a motor and by hand independently of one another, in combination with a limit switch in connection with said differential gear, said differential gear being at least partly interposed between the motor and the limit switch, a self-locking worm capable of being shifted axially in both directions in opposition to the action of a spring being used for the hand drive, and a curved member taking part in the axial movement of the worm and serving for the operation of the limit switches.

3. A valve, the spindle of which is displaceable through a differential gear simultaneously by a motor and by hand independently of one another, in combination with a limit switch in connection with said differential gear, said differential gear being at least partly interposed between the motor and the limit switch, a self-locking worm capable of being shifted axially in both directions in opposition to the action of a spring being used for the hand drive, and a curved member taking part in the axial movement of the worm and serving for the operation of the limit switches, said curved member being so formed that after the switching operation has taken place a further movement of the worm in the direction of the axis has no further effect.

JOHANNES HACKETHAL.